June 20, 1939.    J. C. McCUNE    2,163,433
FORCE FEED LUBRICATOR
Filed May 24, 1935    2 Sheets-Sheet 1

INVENTOR
JOSEPH C. McCUNE
BY Wm. M. Cady
ATTORNEY

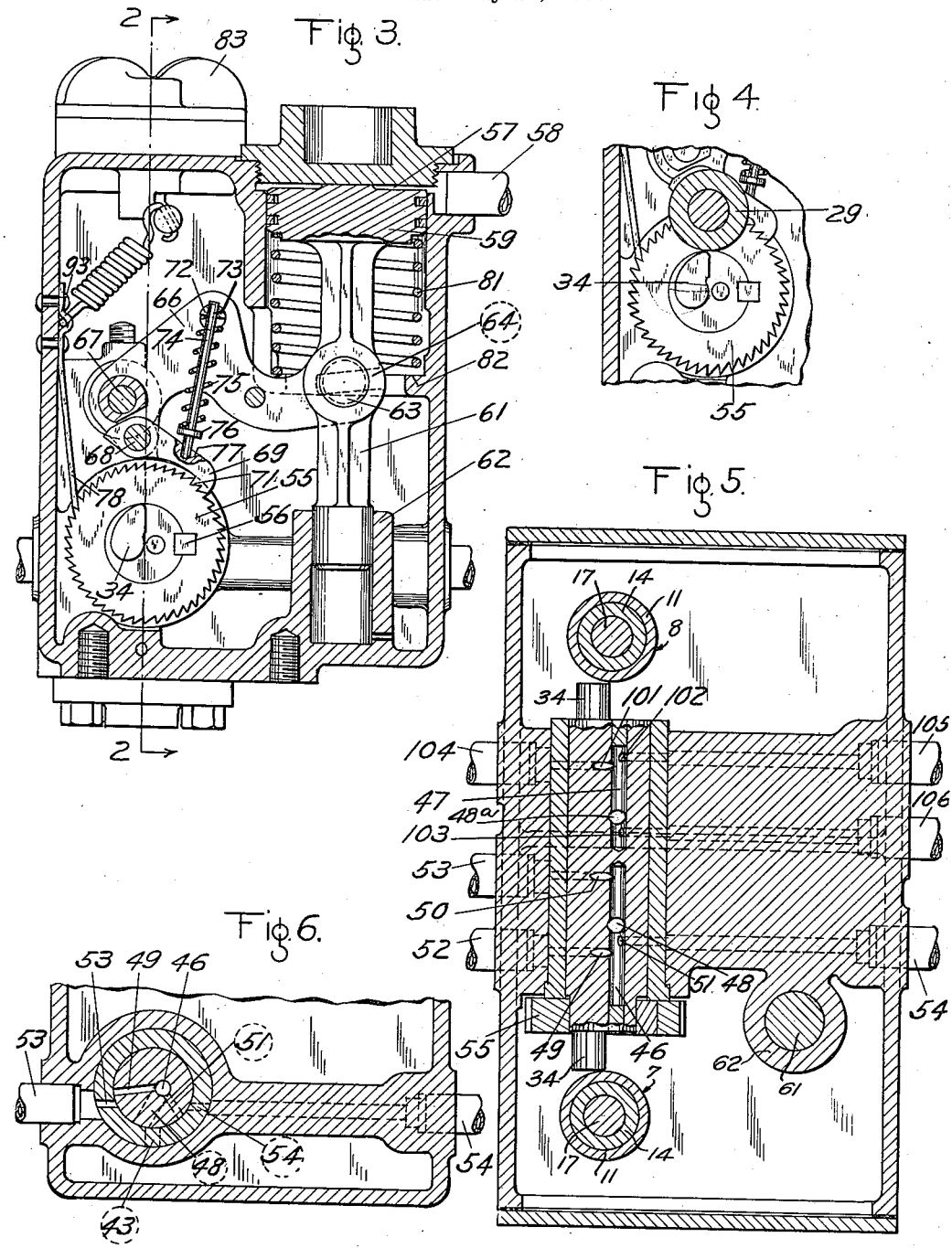

Patented June 20, 1939

2,163,433

UNITED STATES PATENT OFFICE 2,163,433

FORCE FEED LUBRICATOR

Joseph C. McCune, Edgewood, Pa., assignor to The Westinghouse Air Brake Company, Wilmerding, Pa., a corporation of Pennsylvania Application May 24, 1935, Serial No. 23,242

15 Claims. (Cl. 184—35)

This invention relates to the lubrication of mechanical devices and more particularly to a lubricator of the force feed type. The force feed lubricator illustrated and described as comprising one preferred embodiment of my invention, has application to such devices as steam operated air compressors wherein different grades of lubricants are required to be supplied to the steam end and to the air end of such compressors.

One object of my invention is the provision of a force feed lubricator in which a measured supply of lubricant is supplied to the desired part of the machine, or device being lubricated at desired intervals in accordance with operation of the device being lubricated.

Another object of my invention is the provision, in a force feed lubricator of the character described, of means for positively connecting a metering device between a supply of lubricant under pressure and the parts being supplied therefrom, at desired intervals, and for interrupting communication therebetween to prevent the flow of lubricant at other times.

It is a further object of my invention to provide compact metering and pumping mechanisms that are jointly operated for supplying lubricating fluid to points to be lubricated under desired pressures.

Other objects and advantages of my invention will appear in part from the accompanying drawings and in part from the following description of one preferred embodiment thereof.

Figure 1:
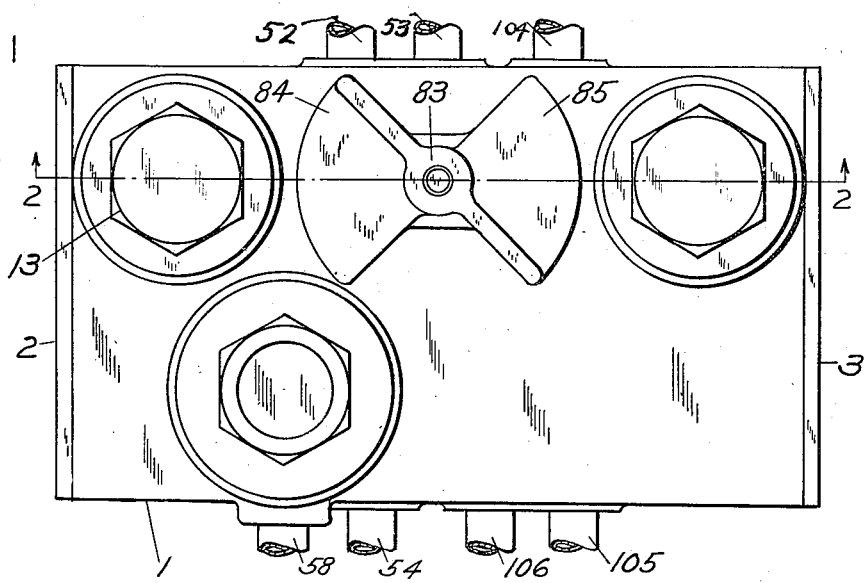
Figure 2:
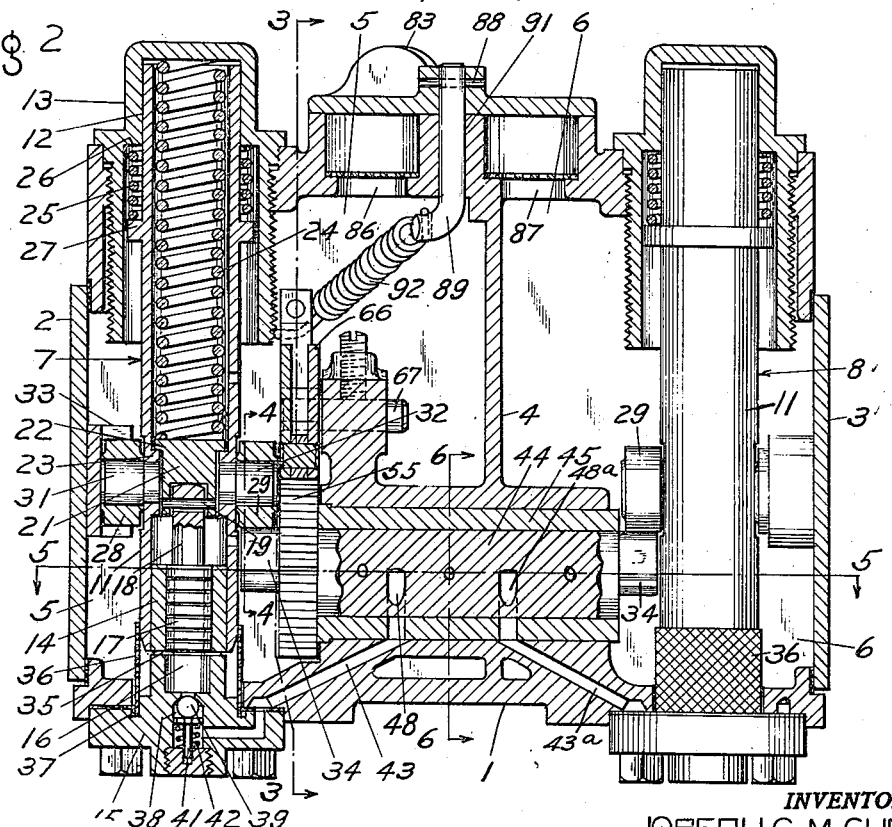

In the accompanying drawings, Fig. 1 illustrates a plan view of a force feed lubricator constructed in accordance with my invention, Fig. 2 is a vertical sectional view taken along the line 2—2 of Fig. 1, Fig. 3 is a vertical sectional view taken along the line 3—3 in Fig. 2, Fig. 4 is a vertical sectional view taken along the line 4—4 in Fig. 2, Fig. 5 is a horizontal sectional view taken along the line 5—5 in Fig. 2, and Fig. 6 is a vertical sectional view taken along the line 6—6 in Fig. 2.

The lubricator comprises an open ended reservoir casing 1 having the ends closed by end plates 2 and 3, and provided with a central wall or partition 4 for dividing the interior of the casing into two chambers 5 and 6 for containing different grades of oil to be supplied to different portions of a device to be lubricated. When the device is used to lubricate a steam operated compressor, oil of one grade for lubricating the air end of the compressor may be supplied to one of the chambers, and oil of a different grade for lubricating the steam end of the compressor may be supplied to the other chamber.

Each oil chamber 5 and 6 contains an oil pump 7 and 8, respectively, which are driven by mechanism that will be later described. Since the two pumps are similar in construction and operation only one pump will be described in detail. The oil pumps may each comprise a sleeve 11, the upper end of which is slidably guided within a bore 12 in a cap nut 13 attached to the upper portion of the casing, and the lower end of which surrounds, and is guided by a stem 14 extending upwardly from a closure member 15 that closes an opening in the bottom of the casing. The upwardly extending stem 14 is hollow to provide a cylindrical pump chamber 16, containing a pump plunger 17 provided with an upwardly extending stem 18 that is attached by a pin 19 to a slide member 21 that is slidably mounted within the sleeve 11 and is provided with a flange 22 for engaging a shoulder 23 within the sleeve 11. A spring 24 is provided within the sleeve 11 for forcing the member 21 downwardly until the flange 22 engages the shoulder 23, the upper end of the spring engaging the cap nut 13 and the lower end engaging the slide member 21. A spring 25 is also provided about the upper end of the sleeve 11, the upper end of the spring engaging a shoulder 26 in the cap nut 13 and the lower end engaging an outwardly extending flange 27 provided on the sleeve 11.

Rollers 28 and 29 are attached to the sleeve 11 by means of bearing pins 31 and 32, respectively, the roller 28 operating within a guide 33 attached to the casing end plate. The roller 29 is adapted to be engaged by a cam 34 for raising the sleeve 11 and the plunger 17 upon operation of operating mechanism to be later described.

Slots or holes 35 are provided in the side wall of the stem 14 for effecting communication between the pump chamber 16 and the oil chamber 5 to permit the flow of lubricating fluid to the pump chamber when the pump plunger 17 is above the slot 35. A cylindrical strainer 36 is provided, closely surrounding the sleeve 11 the lower edges of which fits into an annular groove 37 in the closure member 15.

A valve chamber 38 is provided within the closure member 15 and is in constant open communication with a passage 43 that communicates with a cooperating passage 48 in a shaft 44 which acts as a valve member. The valve chamber 38 contains a ball check valve 39, a stem 41, and a spring 42 for forcing the stem and ball valve 39 upwardly to close communication between the pump chamber 16 and the passage 43.

The shaft 44 is mounted within a bushing 45 within the casing structure and contains longitudinal passages 46 and 47 for communicating with the pump chambers 16 of the pumps 7 and 8, respectively, the passage 46 being provided with a radial passage 48 that is adapted to register with the end of the passage 43. The passage 48 also communicates with radial passages 49, 50 and 51 that are adapted to register with passages and pipes 52, 53 and 54, respectively, leading to various points to be lubricated. Similar radial passages 101, 102 and 103 lead from the central passage 47 to supply fluid from the pump 8 to corresponding supply passages and pipes 104, 105 and 106, while a passage 48a is adapted to establish communication between the passage 47 and a passage 43a leading from the pump 8.

A ratchet wheel 55 is keyed to the shaft 44 by a key 56. Driving mechanism is provided for operating the shaft 44, comprising a piston chamber 57 that is in communication with a source of fluid under pressure through pipe 58, and which contains a piston 59, having a downwardly extending stem 61, the lower end of which is slidably mounted within a bore in a guide wall 62 that extends upwardly from the bottom of the casing.

A pin 63 is carried by the stem 61, and is positioned within a slot 64 in the ends of parallel levers or arms 66, that are pivotally mounted on a pin 67 carried by a bracket portion of the casing structure. The other ends of the arms or levers 66 are pivotally attached by means of a pivot pin 68 to a ratchet puller 69 that is provided with teeth 71 for engaging the teeth of the ratchet wheel 55.

A pin 72 extends between the parallel lever arms 66 and is provided with a bore 73 through which a rod 74 extends. A spring 75 is positioned about the rod 74, the upper end of which engages the pin 72, and the lower end of which engages a flange 76 on the rod 74 for urging it downwardly so that the lower end thereof fits into a recess 77 in the ratchet puller 69 to force the teeth 71 thereof into engagement with the teeth of the ratchet wheel 55. A spring 81 is provided for forcing the piston 59 and the stem 61 upwardly, and extends between the under side of the piston 59 and a flange 82 in the casing structure. A spring latch 78 is provided for engaging the teeth of the ratchet wheel 55 to prevent a clockwise rotation thereof.

A cover plate 83 is provided, having wings 84 and 85 for covering the openings 86 and 87 that are provided for supplying lubricant to the chambers 5 and 6, respectively. The cover 83 is attached, by means of a pin 88, to a stem 89, that extends downwardly through a bore 91 in the casing cover and is attached at its lower end to a spring 92, the other end of which is attached by a suitable means 93 to the wall of the casing so that the spring 92 rotates the cover 83 into a position to close communication from the outside atmosphere to the chambers 5 and 6 through the openings 86 and 87, respectively.

The operation of the force feed lubricator is as follows. Fluid under pressure is periodically supplied through the pipe 58 to the piston chamber 57 to force the piston 59 and the stem 61 downwardly against the force of the spring 81. The fluid under pressure is then released from the piston chamber 57 to permit the piston and stem to be moved upwardly by the spring 81. When the force feed lubricator is used to lubricate an air compressor, the pipe 58 may be connected to one of the air compressing cylinders of the air compressor so that fluid under pressure is supplied to the piston chamber 57 with each stroke of the compressor. Upon each downward stroke of the piston 59 and its stem 61 the pin 63, which engages the slot 64 in the outer end of the lever comprising the two parallel connected arms 66, rotates the lever in a clockwise direction about the pivot pin 67, thus moving the pivot pin 68 and the ratchet wheel puller 69 toward the left, and correspondingly rotating the ratchet wheel 55 in a counter-clockwise direction, the ratchet puller teeth 71 being forced downwardly into engagement with the teeth of the ratchet wheel by the spring 75. Upon the upward movement of the piston 59 and the stem 61, the pivot pin 68 and the ratchet puller 69 are moved toward the right, the ratchet wheel being prevented from so moving by the latch 78 which engages the teeth of the ratchet wheel 55.

As the piston 59 and the stem 61 are thus moved reciprocally upwardly and downwardly, the ratchet wheel 55 and the shaft 44 are correspondingly rotated in a counter clockwise direction, as viewed in Fig. 3, the cams 34 on the opposite ends of the shaft forcing the rollers 29 and the sleeves 11 upwardly against the bias of the springs 25, the shoulders 23 on the sleeves 11 engaging the flanges 22 on the slide members 21 attached to the pump plungers 17, thus raising the plungers against the bias of the springs 24 above the slots 35, and permitting the flow of lubricating fluid from the reservoir chambers 5 and 6 through the slots 35 into the pump chambers 16.

When the ratchet wheel 55 and shaft 44 have been rotated in a counterclockwise direction slightly past the position illustrated in Fig. 4, or so that the downward pressure of the roller 29 against the cam 34 has passed the dead center of the cam action, the springs 25 will force the sleeves 11 and the rollers 29 rapidly downwardly, thus moving the cams 34 and the shaft 44 in a counterclockwise direction rapidly for a portion of a revolution. On initial downward movement of the sleeves 11 communication through the slots 55 is cut off. As each of the sleeves 11 moves downwardly the shoulder 23 moves to relieve the upward pressure on the under side of the flange 22 of the member 21, thus permitting the spring 24 to force the pump plunger 17 downwardly independently of the movement of the sleeve 11 to the extent that the plunger 17 and slide member 21 need not move as rapidly as does the sleeve 11. The downward force of the plunger 17 creates a pressure on the fluid within the pump chamber 16, tending to force it past the check valve 39 and through passage 43, the central passage 46 in the shaft 44, and the several passages and pipes to the points to be lubricated.

The point during the complete revolution of the shaft 44 at which the relatively rapid rotation takes place, is so arranged that, just before this action occurs, the various passages are in the positions illustrated in Fig. 6, and, during this action, the radial passage 49 is moved past a position of registration with the cooperating passage 53, the radial passage 51 is moved past a position of registration with its cooperating passage 54, and the radial supply passage 48 is moved past its position of registration with the passage 43 from the pump chamber 16.

The operation of the pump 8 associated with the lubricant chamber 6 is substantially the same as that of the pump 7 associated with the lubricant chamber 5. The pump 8 associated with the lubricant chamber 6 is operated to supply lubricant under pressure to the passage 43a leading to the central passage 47 in the shaft 44 at the same time that the pump 7 associated with the chamber 5 supplies lubricant to the passage 46 in the shaft 44, while the radial passages 101, 102 and 103 in the shaft 44 register with the supply passages 104, 105 and 106 simultaneously with the registration of the passages 49, 50 and 51 with the passages 52, 53 and 54, respectively. Lubricant will be supplied from the chamber 6, therefore, simultaneously with the supply of lubricant from the chamber 5.

It will be appreciated that, as soon as the high points of the cams 34 pass dead center the springs 25 force the sleeves 11 downwardly to effect a relatively rapid movement of the shaft 44, and, at the same time, the springs 24 force the pump plungers 17 downwardly to create a pressure within the pump chambers 16, the cooperative effect of these two actions being to supply measured quantities of lubricating fluid through the radial passages of the shaft 44 which are brought into registration with the cooperating passages in the bushing 45 surrounding the shaft for a relatively short time. The above mentioned rapid rotation or movement of the shaft 44 begins just prior to registration between the cooperating ports in the shaft 44 and in the bushing, and terminates shortly following the cutting off of communication between these passages. A small quantity of oil is delivered through these passages upon each said operation of the device.

It will be noted in the construction above described that the sleeve 11, upon its downward movement about the stem 14, substantially fills the space between this stem and the cylindrical strainer member 36, and, as it moves downwardly into this space it forces any lubricant therein radially through the strainer back into the chamber 5, thus tending to eliminate any dirt that may have collected upon this strainer to thus effect a self cleaning action thereof.

If the air compressor with which the lubricating device is associated continues to be operated, the piston 59 will continue to be reciprocated and the ratchet puller 69 will continue to turn the ratchet wheel 55 and the shaft 44. After a predetermined amount of movement of the shaft 44 the cams 34 carried thereby engage the rollers 29 carried by the sleeves 11 so that upon further turning of the shaft 44 the sleeves 11 are lifted against the springs 25, while the shoulders 23 on the sleeves engage the flanges 22 on the members 21 and move them against the springs 24 and lift the plungers 17 in the pump chambers 16.

When the sleeves 11 are raised substantially to the upper ends of their range of movement, they open communication through the slots 35 so that lubricant may flow to the pump chambers 16 to fill them with lubricant to be subjected to pressure on the next downward movement of the plungers 17.

On continued turning of the ratchet wheel 55 and the shaft 44 by operation of the piston 59, the cams 34 are again moved beyond the dead center position, and the cycle of operation described in detail above is repeated.

Having now described my invention, what I claim as new and desire to secure by Letters Patent, is:

1. In a force feed lubricator, the combination of a reservoir, a shaft having passages therethrough, a passage for supplying lubricant from said reservoir to the passages in said shaft, passages for supplying lubricant from the passages in said shaft to parts to be lubricated, said shaft being provided with a ratchet wheel and a cam, means for actuating the ratchet wheel at intervals, biasing means for resisting said movement and effective when the shaft has reached a position just prior to registration of said several cooperating passages to spin the shaft past the position of registration of said cooperating passages to effect the supply of a measured amount of lubricant to said parts to be lubricated.

2. In a force feed lubricator, the combination of a reservoir, a hollow stem in said reservoir providing a pump chamber, a pump plunger therein, a sleeve surrounding and guided by said stem, resilient means for moving said plunger, resilient means for moving said sleeve toward said stem, means for moving said sleeve and said plunger against said resilient means and for thereafter causing said resilient means to effect a pumping stroke of the pump plunger.

3. In a force feed lubricator, the combination of a reservoir, a hollow stem in said reservoir providing a pump chamber, a pump plunger therein, a sleeve surrounding and guided by said stem, resilient means for moving said plunger, resilient means for moving said sleeve toward said stem, a valve mechanism, power means for first moving said sleeve against said resilient means, means for operatively connecting said sleeve and said plunger for simultaneously moving the plunger against its associated resilient means, said power means being then effective to simultaneously permit said two resilient means to move said sleeve and plunger and effect a rapid pumping stroke of said pump plunger and a stroke of said sleeve, said sleeve being effective to operate said valve mechanism to permit the flow of a measured quantity of lubricant from said pump chamber to the parts to be lubricated.

4. In a force feed lubricator, in combination, a reservoir, a pump means for forcing a lubricating liquid from said reservoir to parts to be lubricated and valve means for controlling communication from said pump to the parts to be lubricated, and power means for effecting the simultaneous operation of said pumping means and said valve means, said pumping means comprising a pump chamber in said reservoir, a pump plunger therein, a sleeve surrounding said chamber, said sleeve being provided with a flange for operatively engaging said pump plunger to raise it from said chamber, resilient means for said plunger and resilient means for said sleeve, said valve means being provided with a rotary shaft having passages therein for registering with a passage leading from said pump chamber and with passages leading to the parts to be lubricated, means for effecting a gradual rotation of said shaft and cam means carried by the shaft for operatively engaging said sleeve to first move it and the pump plunger against said several resilient means, said several resilient means being operative when said cam means is past dead center to then effect a spinning operation of said shaft and to move the plunger in the pump chamber in the direction to force lubricant from said chamber.

5. In a force feed lubricator, in combination, a lubricating reservoir, a hollow stem extending upwardly from the bottom of said reservoir and providing a pump chamber containing a pump plunger, a sleeve surrounding said stem and extending upwardly therefrom, resilient means for forcing said sleeve downwardly about said stem and resilient means for forcing said plunger downwardly into said pump chamber, openings in the side wall of said stem for admitting lubricant from said reservoir into said pump chamber, a cylindrical strainer extending upwardly from the bottom of said reservoir closely about said sleeve, the lower end of said sleeve, upon being forced downwardly about the stem, effecting a cleaning action of said strainer.

6. In a force feed lubricator, in combination, a lubricating reservoir, a pump for forcing lubricant therefrom to points to be lubricated and comprising a cylindrical stem extending from the casing of the reservoir and providing a pump chamber therein containing a pump plunger, openings in the wall of said stem to provide communication from said reservoir to said pump chamber, a sleeve surrounding and guided by said stem and movable with said pump plunger to close said communication through the openings in the wall of said stem, a cylindrical strainer surrounding said stem and spaced therefrom to permit the sleeve to move in the space therebetween, said sleeve operating to force lubricating liquids through said strainer in a direction the reverse of its normal flow to effect a self cleaning action of the strainer.

7. In a force feed lubricator, in combination, a lubricating reservoir, a valve mechanism comprising a revolvable body having passages therethrough, cooperating passages leading from said body to the points to be lubricated, and cooperating passages cooperating therewith communicating with said reservoir, a pump in said reservoir for supplying lubricant under pressure through said passages when the revolvable body is in position to effect registration between the passages therethrough and the cooperating passages, power means for gradually rotating said revolvable member in accordance with the desired rate of lubrication, resilient means for first resisting said movement for a portion of said revolution and for then effecting a spinning action thereof for the portion of the revolution during which said cooperating passages are brought into registration, to effect the supply of a measured quantity of fluid through said passages.

8. In a force feed lubricator, in combination, a reservoir, lubricant forcing mechanism for forcing lubricant from said reservoir, a rotary shaft having passages therein adapted to register with passages leading from said lubricant forcing mechanism, resilient means adapted to store energy, power supplying means for supplying energy to said resilient means, and means for thereafter releasing energy from said resilient means for effecting the simultaneous operation of said lubricant forcing mechanism and said rotary shaft to effect the supply of a quantity of fluid from said reservoir.

9. In a lubricating device, a plunger for supplying lubricant under pressure from a chamber to a passage through which lubricant may be supplied to mechanism to be lubricated, a member for establishing and cutting off communication through said passage, spring means associated with said plunger, and means to successively stress said spring means to store energy therein and to thereafter release said spring means, said spring means being operative on the release thereof to operate the plunger to supply lubricant under pressure to said passage and to operate said member to establish communication through said passage.

10. In a lubricating device, a plunger reciprocably movable in a chamber, a spring associated with said plunger, said plunger being movable against said spring to draw lubricant into said chamber and being movable by said spring to force lubricant from said chamber to a passage through which lubricant may be supplied to mechanism to be lubricated, a member for establishing and for cutting off communication through said passage, a spring associated with said member, the member being movable against said spring and being movable by said spring to a position to establish communication through said passage, and means for first moving said plunger and said member against the springs associated therewith and for thereafter simultaneously permitting the springs to move said plunger and said member.

11. In a lubricating device, a plunger reciprocable in a chamber, a spring associated with said plunger, the plunger being movable against said spring to draw lubricant into said chamber and being movable by said spring to force lubricant from said chamber to a passage through which lubricant may be supplied to mechanism to be lubricated, a rotatable member for moving said plunger against said spring and for also establishing and cutting off communication through the passage through which lubricant is forced by said plunger, and driving means for turning said rotatable member in a given direction, the connection between the driving means and the rotatable member including a ratchet adapted to permit the rotatable member to be moved in said given direction relative to said driving means, whereby after movement of the rotatable member to a predetermined position the spring is operative to move the plunger and to also move the rotatable member relative to the driving means.

12. In a force feed lubricator, in combination, a plunger reciprocable in a chamber, resilient means for urging said plunger in the direction to force lubricant from said chamber to a passage from which lubricant is supplied to lubricate the mechanism to be lubricated, a reciprocable member for moving said plunger in the direction to draw lubricant into said chamber against the resistance of the resilient means, said reciprocable member being ineffective to move the plunger in a direction to force lubricant from said chamber, resilient means for opposing movement of said member to move said plunger, and means for first moving said member and thereby said plunger against the resistance of the respective resilient means and then permitting the respective resilient means to move said member and said plunger.

13. In a force feed lubricator, in combination, a plunger reciprocable in a chamber, resilient means for urging said plunger in the direction to force lubricant from said chamber to a passage from which lubricant is supplied to lubricate the mechanism to be lubricated, a reciprocable member for moving said plunger in the direction to draw lubricant into said chamber against the resistance of the resilient means and adapted for movement relative to said plunger, said reciprocable member being ineffective to move the plunger in a direction to force lubricant from said chamber, resilient means for opposing movement of said member to move said plunger, and means for first moving said member and thereby said plunger against the resistance of the respective resilient means and then permitting the respective resilient means to move said member and said plunger.

14. In a force feed lubricator, in combination, a plunger reciprocable in a chamber, resilient means for urging said plunger in the direction to force lubricant from said chamber to a passage from which lubricant is supplied to lubricate the mechanism to be lubricated, a reciprocable member for moving said plunger in the direction to draw lubricant into said chamber against the resistance of the resilient means, resilient means for opposing movement of said member to move said plunger, means for first moving said member and thereby said plunger against the resistance of the respective resilient means and then permitting the respective resilient means to move said member, and said plunger, and means operated by said member for establishing and cutting off communication through which lubricant is supplied from said passage to the mechanism to be lubricated.

15. In a force feed lubricator, in combination, a lubricating reservoir, a stem extending upwardly from the bottom of said reservoir and providing a pump chamber containing a pump plunger, a movable sleeve surrounding said stem and extending upwardly therefrom about the pump plunger and operatively engaging the pump plunger to move the same upwardly, a resilient means for engaging said sleeve to force the sleeve downwardly, resilient means for engaging the pump plunger for forcing the plunger downwardly, a rotatable valve member and means for actuating the same in a step by step manner, said rotatable valve member being provided with passages communicating with points to be lubricated and with a passage communicating with said pump chamber, said valve member being provided with a cam for operatively engaging said sleeve to force the sleeve and said plunger upwardly against said resilient means, the resilient means associated with the sleeve being effective when said cam has passed its dead center point to force the sleeve downwardly and to spin said valve member past the point of registration of said several passages contained therein with the cooperating passages connecting the pump chamber to the points to be lubricated.

JOSEPH C. McCUNE.